United States Patent
Yu

[11] 3,973,147
[45] Aug. 3, 1976

[54] TEMPERATURE MEASURING CIRCUIT
[75] Inventor: Ruey J. Yu, Flint, Mich.
[73] Assignee: General Motors Corporation, Detroit, Mich.
[22] Filed: Oct. 28, 1975
[21] Appl. No.: 626,192

[52] U.S. Cl. .......................... 307/310; 73/362 AR; 73/362 SC
[51] Int. Cl.² ........................................ G01K 7/24
[58] Field of Search ................ 73/362 AR, 362 SC; 307/310

[56] References Cited
UNITED STATES PATENTS

| | | | |
|---|---|---|---|
| 2,871,376 | 1/1959 | Kretzmer | 307/310 |
| 3,102,425 | 9/1963 | Westman et al. | 73/362 SC |
| 3,106,645 | 10/1963 | Kaufman | 307/310 |
| 3,708,700 | 1/1973 | Moser | 307/310 X |
| 3,779,079 | 12/1973 | Snook | 73/362 SC X |

FOREIGN PATENTS OR APPLICATIONS

| | | | |
|---|---|---|---|
| 828,307 | 2/1960 | United Kingdom | 73/362 SC |

Primary Examiner—Richard C. Queisser
Assistant Examiner—Frederick Shoon
Attorney, Agent, or Firm—Howard N. Conkey

[57] ABSTRACT

A temperature measuring circuit provides a signal varying linearly in response to temperature variations over a temperature range and includes a thermistor coupled between the collector of a transistor and one terminal of a regulated voltage source. A resistor is coupled between the emitter of the transistor and a second terminal of the voltage source. The voltage at the collector of the transistor varies substantially linearly with variations in the resistance of the thermistor over one segment of the temperature range when the transistor is operated in its linear region. The base of the transistor is biased so that it is operated in its linear region for values of resistance of the thermistor in the one segment of the temperature range and is operated between its linear and saturated regions for values of resistance of the thermistor at temperatures in the remaining segment of the temperature range so that the voltage at the collector electrode varies linearly with the temperature sensed by the thermistor over the complete temperature range.

2 Claims, 5 Drawing Figures

TEMPERATURE MEASURING CIRCUIT

This invention relates to a temperature measuring circuit, and more specifically, this invention relates to a temperature measuring circuit which provides an output signal which varies linearly over a wide range of sensed temperatures.

It is well known that the resistance of thermistors varies exponentially as a function of the temperature sensed by the thermistor. As a result, the use of thermistors as temperature sensors in some applications requiring a linear output over a wide temperature range is precluded. In some applications, the range of temperatures sensed by the thermistor may be limited in order to obtain an approximate linear readout with the thermistor operating on a specific small segment of its temperature sensing range. In other applications, the nonlinear output of the thermistor is tolerated or compensated, for example, by using a non-linear calibration on a readout unit.

In view of the foregoing, it is the general object of this invention to provide for an improved temperature measuring circuit.

It is another object of this invention to provide a thermistor temperature measuring circuit having an output signal whose magnitude varies linearly as a function of temperature over a wide temperature range.

These and other objects of this invention are accomplished by the use of a thermistor in conjunction with a transistor which is operated in its linear region over a first segment of a temperature range and in its nonlinear region over the remaining segment of the temperature range to provide a linear output over the entire temperature range.

The invention may be best understood by reference to the following description of a preferred embodiment and the drawings in which.

Figure 1:
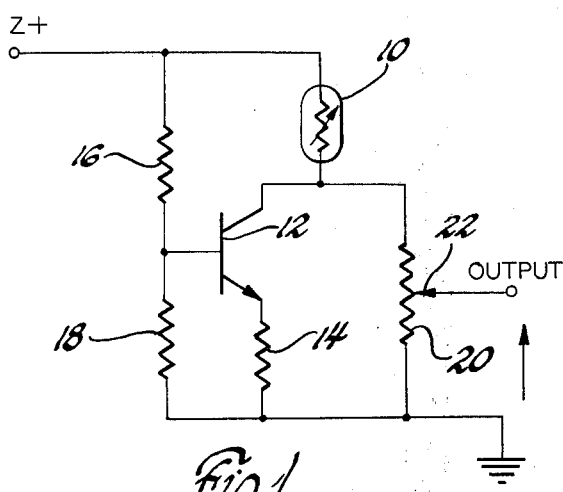
FIG. 1 is a schematic diagram of the temperature measuring circuit of this invention.

Referring to FIG. 1, the temperature sensing circuit of this invention includes a negative temperature coefficient thermistor 10 coupled between the positive terminal of a regulated voltage source Z+ and the collector of an NPN transistor 12. The emitter of the transistor 12 is coupled to ground through a resistor 14. A pair of series coupled resistors 16 and 18 are coupled between the positive terminal of the regulated voltage source Z+ and ground. The junction between the resistors 16 and 18 are coupled to the base of the transistor 12 to provide a bias therefor. A potentiometer 20 is coupled between the collector of the transistor 12 and ground. A wiper arm 22 of the potentiometer 20 supplies a voltage representing the output of the temperature measuring circuit.

Figure 2:
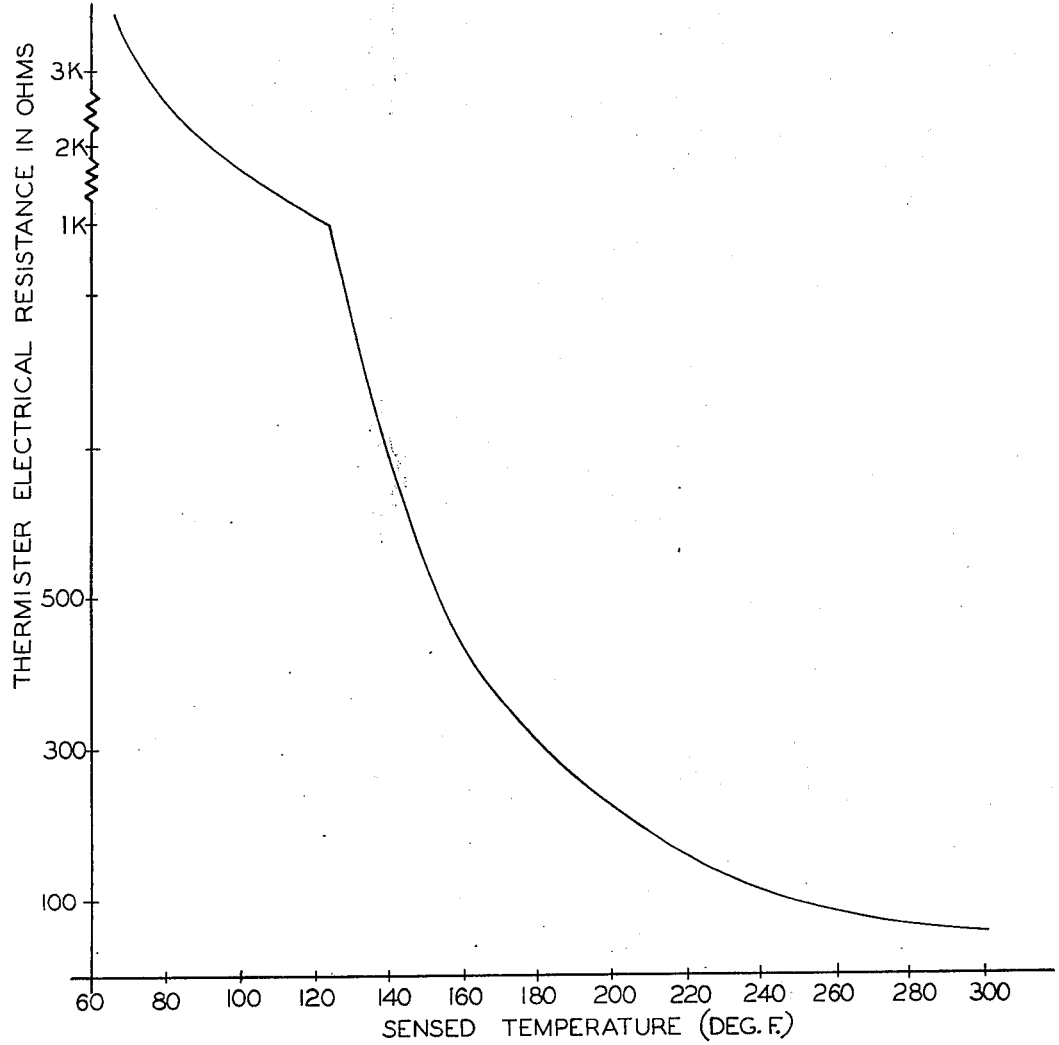
FIG. 2 is a diagram illustrating the resistance of a typical thermistor as a function of sensed temperature.

An example of a thermistor which can be used in the circuit of FIG. 1 is one having the temperature-resistance characteristics illustrated in FIG. 2 wherein the thermistor resistance is illustrated over a temperature range from 60° to 300°F. This range represents a range of temperatures to be sensed by the circuit of FIG. 1. As can be seen, the thermistor resistance varies exponentially as a function of sensed temperature.

Figure 3:
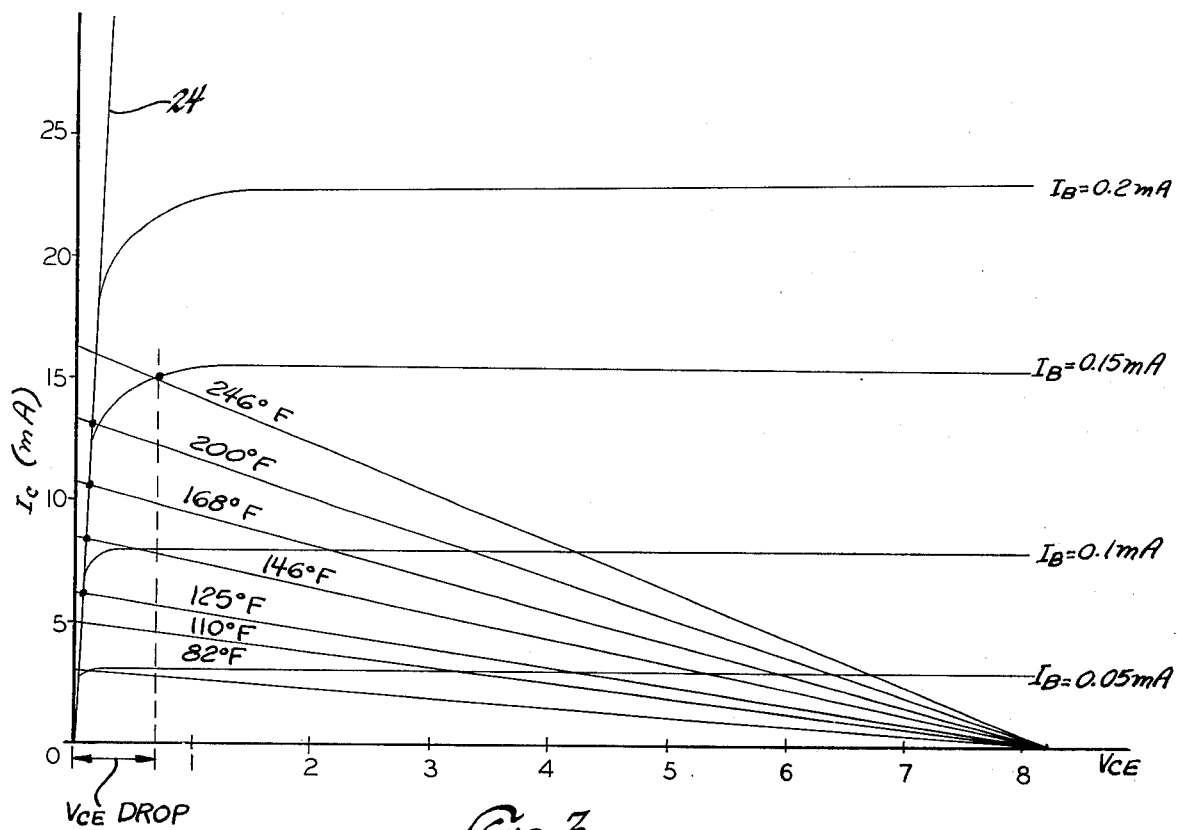
FIG. 3 is a diagram of the characteristics of a typical transistor used in the present invention.

The transistor 12 may, for illustration purposes, take the form of Motorola transistor No. MPS-A55 having the $I_C$ - $V_{CE}$ characteristics illustrated in FIG. 3.

When the transistor having the characteristics of FIG. 3 is operated in its linear region, it will have a base current falling on the base current line 24. The relationship between the collector current and the collector to emitter voltage when the transistor 12 is operated in its linear region can be approximated by use of the slope of the base current line 24. The general relationship is defined by the equation $$I_c = V_{CE}/k \qquad (1)$$

where $k$ is determined by the slope of the base current line 24. In the transistor characteristics illustrated in FIG. 3, the relationship between collector current and collector to emitter voltage when the transistor 12 is operated in its linear region can be approximated by the expression $$I_c = V_{CE}/10. \qquad (2)$$

The expression for the load line of the circuit of FIG. 1 is defined by the equation $$V_{CE} = Z+ - I_c (R_x + R_t) \qquad (3)$$

where $R_x$ is the resistance of the resistor 14 and $R_t$ is the resistance of the thermistor 10. Solution of the equations 1 and 3 results in an equation for the voltage at the collector of the transistor 12 as follows when the transistor 12 is operated at its linear region:

$$V_c = Z+ ((k + R_x)/(k + R_x + R_t)) \qquad (4)$$

Assuming for illustration purposes that the resistor 14 has an impedance of 400 ohms and that the regulated voltage source Z+ supplies a regulated voltage of 8.2 volts, the expression for the voltage $V_c$ at the collector of the transistor 12 when the transistor 12 is operated in its linear region is $$V_c = 8.2 (410/(410 + R_t)) \qquad (5)$$

Figure 4:
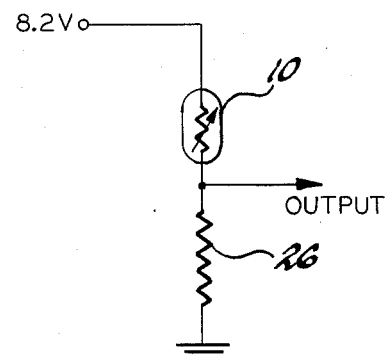
FIG. 4 is a schematic diagram of an equivalent circuit for the circuit of FIG. 1 for temperatures sensed in a first segment of the range of temperatures sensed by the temperature measuring circuit of FIG. 1.

From this equation, the circuit of FIG. 1 when the transistor 12 is operating in its linear region can be expressed by the equivalent circuit illustrated in FIG. 4 wherein the thermistor 10 is series coupled with a resistor 26 having a resistance of 410 ohms, the series circuit being coupled across the regulated 8.2 volt supply.

Figure 5:
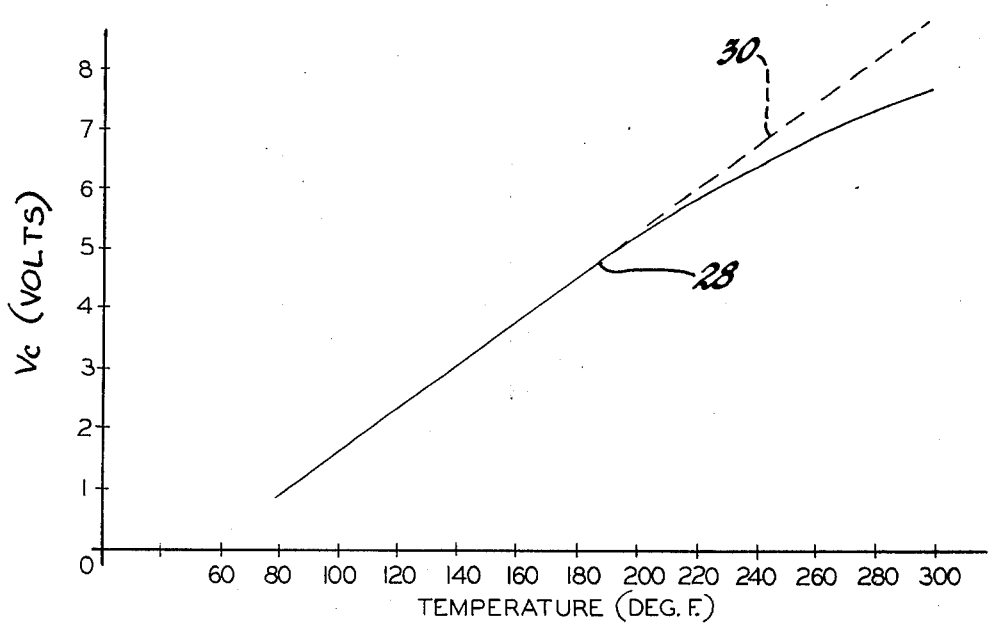
FIG. 5 is a diagram of the output of the circuit of FIG. 1.

The output voltage of the equivalent circuit of FIG. 4 over the complete temperature range in the specific example, between 60° and 300°F, as sensed by the thermistor 10 is illustrated by the solid line curve 28 of FIG. 5. The solid line curve 28 of FIG. 5 assumes that the transistor 12 is operated in its linear region over the entire temperature range between 60° and 300°F. As seen in FIG. 5, the curve 28 is substantially linear over the segment between the temperatures of 60° and 200°F after which the curve becomes noticeably nonlinear. Consequently, the equivalent circuit of FIG. 4 functions to provide a substantially linear output between the temperatures of 60° and 200°F. Therefore, if the transistor 12 is biased so that it operates in its linear region for values of thermistor 10 resistance between the sensed temperatures 60° and 200°F, the output signal from the circuit of FIG. 1 will vary linearly with the sensed temperature.

In order to provide for a linear output indication over the entire temperature range between 60° and 300°F the nonlinear operating characteristics of the transistor 12 when operating between its linear and saturated regions is utilized to compensate for the nonlinear portion of the curve 28 above 200°F. This is accomplished by selecting the values of the resistors 16 and 18 so that the transistor 12 is operated in its linear region for all values of resistances of the thermistor 10 between the temperatures of 60° and 200°F and operates in its nonlinear region for values of resistances of the thermistor at temperatures in excess of 200°F. Resistances of 2K and 10K for the resistors 16 and 18, respectively, were used in the specific example described. In this manner, the linear characteristics of the equivalent circuit of FIG. 4 are obtained by operation of the circuit of FIG. 1 between the temperatures of 60° and 200°F. Further, the nonlinear characteristics of the transistor 12 between 200° and 300°F provide for continued linear output of the circuit of FIG. 1 over the 200°–300°F segment of the sensing range.

A number of load lines is illustrated in FIG. 3 for values of temperatures sensed up to 200°F when the transistor 12 is being operated in its linear region. For temperatures above 200°F, the transistor 12 operates on the knee of the base current lines where its operation is nonlinear. For example, for a sensed temperature of 246°F, the transistor 12 at the intersection of the corresponding load line and the 0.15 ma base current curve. As can be seen, the collector to emitter voltage is then approximately 0.67 volts versus approximately 0.15 volts at a sensed temperature of 200°F. The resulting collector voltage of the transistor 12 between the temperatures of 200° and 300°F is illustrated by the dotted line curve 30 of FIG. 5. As can be seen, the combination of the lower segment of the line 28 below 200°F and the line 30 of FIG. 5 approximates a straight line between the temperatures of 60° and 300°F. In this manner the output voltage from the circuit of FIG. 1 varies in a linear manner in response to temperature changes over the entire temperature range from 60° to 300°F.

The potentiometer 20 has a large resistance so as not to effect the operation of the circuit as described and is inserted so as to provide for an adjustment of the slope of the voltage output line as a function of sensed temperature.

The circuit of FIG. 1 has been described with the components having specific values for illustration purposes only. The principles of operation of the circuit of FIG. 1 can be applied to thermistors having other ranges of operation, either higher or lower than the specific range illustrated with appropriate adjustment of the remaining circuit values. Further, the circuit has been illustrated with the transistor 12 being an NPN transistor. The circuit configuration can be modified so as to use a PNP transistor and which would provide a voltage output with a negative slope as a function of increasing temperature.

What has been described is a temperature sensing circuit for providing a signal varying linearly over a large temperature range wherein one segment of the temperature range is provided by the circuit operating in one mode (transistor operating in its linear region) and another segment of the temperature range is provided by the circuit operating in a second mode (the transistor operating in its nonlinear region).

The foregoing description of the preferred embodiment for the purposes of explaining the principles thereof is not to be considered as limiting or restricting the invention since many modifications may be made by the exercise of skill in the art without departing from the scope of the invention.

What is claimed is:

1. A temperature measurement circuit for providing an output signal varying linearly in response to temperature variations over a temperature range between temperatures $T_1$ and $T_2$, the circuit comprising: a voltage source having a pair of output terminals and effective to supply a voltage V; a transistor having base, emitter and collector electrodes; a thermistor coupled between the collector electrode and one terminal of the voltage source, the thermistor having a resistance $R_t$ varying exponentially as a function of the temperature sensed by the thermistor; a resistor having a resistance $R_x$ coupled between the emitter electrode and the other one of the terminals of the voltage source, the quantity $$V((k + R_x)/(k + R_x + R_t))$$

being substantially linear as a function of temperatures sensed by the thermistor between the temperatures $T_1$ and a temperature $T_3$ intermediate the temperatures $T_1$ and $T_2$ and being nonlinear as a function of temperatures sensed by the thermistor between the temperatures $T_3$ and $T_2$, where $k$ is a constant equal to the voltage between the collector and emitter electrodes divided by the collector electrode current when the transistor is operated in its linear region; and bias means effective to bias the base electrode of the transistor so that the transistor is operated in its linear region for values of $R_t$ between the temperatures $T_1$ and $T_3$ and is operated between its linear and saturated regions for values of $R_t$ between the temperatures $T_3$ and $T_2$, whereby the magnitude of the voltage at the collector electrode varies substantially linearly as a function of temperature between the temperatures $T_1$ and $T_2$.

2. A temperature measurement circuit for providing an output signal varying linearly in response to temperature variations over a temperature range between temperatures $T_1$ and $T_2$, the circuit comprising: a voltage source effective to supply a voltage V; an NPN transistor having base, emitter and collector electrodes; a negative temperature coefficient thermistor coupled between the collector electrode and the positive side of the voltage source, the thermistor having a resistance $R_t$ varying exponentially as a function of the temperature sensed by the thermistor; a resistor having a resistance $R_x$ coupled between the emitter electrode and the negative side of the voltage source, the quantity $$V((k + R_x)/(k + R_x + R_t))$$

being substantially linear as a function of temperatures sensed by the thermistor between the temperatures $T_1$ and a temperature $T_3$ intermediate the temperatures $T_1$ and $T_2$ and being nonlinear as a function of temperatures sensed by the thermistor between the temperatures $T_3$ and $T_2$, where $k$ is a constant equal to the voltage between the collector and emitter electrodes divided by the collector electrode current when the transistor is operated in its linear region; a voltage divider coupled across the voltage source and effective to generate a bias voltage; and means effective to couple the bias voltage to the base electrode of the transistor, the bias voltage having a value so as to bias the base electrode of the transistor so that the transistor is operated in its linear region for values of $R_t$ between the temperatures $T_1$ and $T_3$ and is operated between its linear and saturated regions for values of $R_t$ between the temperatures $T_3$ and $T_2$, whereby the magnitude of the voltage at the collector electrode varies substantially linearly as a function of temperature between the temperatures $T_1$ and $T_2$.

* * * * *